United States Patent
Ding et al.

(10) Patent No.: US 10,857,696 B2
(45) Date of Patent: Dec. 8, 2020

(54) DEVICE AND METHOD FOR HEATING AND CURING ARTIFICIAL STONE WITH MICROWAVE

(71) Applicants: Institute of Electronics, Chinese Academy of Sciences, Beijing (CN); Guangxi Academy of Sciences, Nanning (CN); Guangxi Lisheng Stone Co., Ltd., Hezhou (CN); Guangxi Hezhou Mining Industry Investment Group, Hezhou (CN)

(72) Inventors: Haibing Ding, Beijing (CN); Zhaochuan Zhang, Beijing (CN); Dianyi Sun, Beijing (CN); Zhimin Huang, Guangxi (CN); Zhiqiang Zhang, Beijing (CN); Liang Tang, Beijing (CN); Weisong Li, Beijing (CN); Dengfeng Lu, Beijing (CN); Songjun Liu, Hezhou (CN); Ke Tang, Beijing (CN); Ren Xiao, Beijing (CN)

(73) Assignees: INSTITUTE OF ELECTRONICS, CHINESE ACADEMY OF SCIENCES, Beijing (CN); GUANGXI ACADEMY OF SCIENCES, Guangxi (CN); GUANGXI LISHENG STONE CO., LTD., Guangxi (CN); GUANGXI HEZHOU MINING INDUSTRY INVESTMENT GROUP, Guangxi (CN)

( * ) Notice: Subject to any disclaimer, the term of this patent is extended or adjusted under 35 U.S.C. 154(b) by 355 days.

(21) Appl. No.: 15/735,590

(22) PCT Filed: Sep. 7, 2015

(86) PCT No.: PCT/CN2015/089053
§ 371 (c)(1),
(2) Date: Dec. 11, 2017

(87) PCT Pub. No.: WO2016/197465
PCT Pub. Date: Dec. 15, 2016

(65) Prior Publication Data
US 2019/0022892 A1    Jan. 24, 2019

(30) Foreign Application Priority Data
Jun. 11, 2015 (CN) .......................... 2015 1 0319632

(51) Int. Cl.
   B28B 11/24      (2006.01)
   C04B 40/02      (2006.01)
   (Continued)

(52) U.S. Cl.
   CPC ............ B28B 11/241 (2013.01); B28B 1/005 (2013.01); B29C 35/0805 (2013.01);
   (Continued)

(58) Field of Classification Search
   CPC ........ B29C 2035/0855; B29C 35/0805; B28B 11/241; B28B 1/005; C04B 26/02; C04B 40/0014; C04B 2111/542; H05B 6/64
   See application file for complete search history.

(56) References Cited

U.S. PATENT DOCUMENTS 4,338,135 A * 7/1982 Cook .................... B28B 11/245
                                                        106/723
4,529,857 A * 7/1985 Meek .................... C04B 37/005
                                                        156/272.2

(Continued)

FOREIGN PATENT DOCUMENTS

CN      101096112 A * 1/2008 ......... C04B 41/5037
CN      102627429 A    8/2012
(Continued)

OTHER PUBLICATIONS

Feng, Tong, et al. "Numerical simulation and experiment of hardening behaviors in unsaturated polyester resin artificial marble blocks under microwave radiation." IEEE Transactions on Plasma Science 44.10 (Sep. 7, 2016): 2485-2492. (Year: 2016).*

(Continued)

Primary Examiner — Benjamin A Schiffman
(74) Attorney, Agent, or Firm — Kilpatrick Townsend & Stockton LLP

(57) ABSTRACT

A device and a method for heating and curing artificial stone with microwave are provided. The device includes a microwave curing cavity, within which an incompletely cured artificial stone is placed, and microwave is used to heat the artificial stone to completely cure the artificial stone; wherein, a frequency of the microwave is in a range of 300~1120 MHz. The present disclosure provides a separately designed microwave curing cavity, and utilizes 300~1120 MHz microwave having a large penetrating depth, to realize a rapid curing of a large-sized artificial stone.

20 Claims, 2 Drawing Sheets

(51) Int. Cl.
| | | |
|---|---|---|
| B29C 67/24 | (2006.01) | |
| B29C 35/08 | (2006.01) | |
| C04B 26/02 | (2006.01) | |
| H05B 6/64 | (2006.01) | |
| B28B 1/00 | (2006.01) | |
| C04B 40/00 | (2006.01) | |
| H05B 6/76 | (2006.01) | |
| H05B 6/80 | (2006.01) | |
| C04B 111/54 | (2006.01) | |
| C04B 26/06 | (2006.01) | |
| C04B 26/18 | (2006.01) | |

(52) U.S. Cl.
CPC ............ *B29C 67/243* (2013.01); *C04B 26/02* (2013.01); *C04B 40/0014* (2013.01); *C04B 40/0218* (2013.01); *B29C 2035/0855* (2013.01); *C04B 26/06* (2013.01); *C04B 26/18* (2013.01); *C04B 2111/542* (2013.01); *H05B 6/64* (2013.01); *H05B 6/76* (2013.01); *H05B 6/80* (2013.01); *H05B 2206/046* (2013.01)

(56) References Cited

U.S. PATENT DOCUMENTS

| | | | | |
|---|---|---|---|---|
| 5,072,087 | A * | 12/1991 | Apte | C04B 35/111 |
| | | | | 156/272.4 |
| 5,321,223 | A * | 6/1994 | Kimrey, Jr. | H05B 6/64 |
| | | | | 219/745 |
| 8,436,074 | B2 * | 5/2013 | Buskila | C04B 26/02 |
| | | | | 523/171 |
| 9,708,218 | B2 * | 7/2017 | Hunig | C04B 40/0014 |
| 9,737,851 | B2 * | 8/2017 | Crawford | B29D 99/0089 |
| 10,518,439 | B2 * | 12/2019 | Tolzman | B29C 67/242 |
| 2002/0190438 | A1 * | 12/2002 | Landauer | C04B 26/04 |
| | | | | 264/489 |
| 2004/0032044 | A1 * | 2/2004 | Toncelli | B44F 5/00 |
| | | | | 264/71 |
| 2016/0257615 | A1 * | 9/2016 | White | C04B 14/06 |
| 2019/0022892 | A1 * | 1/2019 | Ding | C04B 40/0218 |

FOREIGN PATENT DOCUMENTS

| | | | | |
|---|---|---|---|---|
| CN | 104987126 A | | 10/2015 | |
| CN | 106477963 A | * | 3/2017 | |
| DE | 19543266 A1 | | 5/1997 | |
| DE | 20111670 U1 | * | 10/2001 | ............ C04B 26/16 |
| DE | 10208837 A1 | * | 9/2003 | ........... C04B 26/285 |
| JP | 04197609 A | | 7/1992 | |
| JP | 0788851 A | | 4/1995 | |
| WO | WO-2014029008 A1 | * | 2/2014 | ........... B28B 11/043 |

OTHER PUBLICATIONS

International Search Report for international application No. PCT/CN2015/089053, dated Mar. 21, 2016 with English translation.

* cited by examiner

DEVICE AND METHOD FOR HEATING AND CURING ARTIFICIAL STONE WITH MICROWAVE

CROSS-REFERENCE TO RELATED APPLICATIONS

This application is a Section 371 National Stage Application of International Application No. PCT/CN2015/089053, filed on 7 Sep. 2015, entitled "DEVICE AND METHOD FOR HEATING AND CURING ARTIFICIAL STONE WITH MICROWAVE", which claims priority to Chinese Application No. 201510319632.9, filed on 11 Jun. 2015, incorporated herein by reference in its entirety.

TECHNICAL FIELD

The present disclosure relates to the technical field of applications of microwave, and particularly, to a device and a method for heating and curing artificial stone with microwave.

BACKGROUND

An artificial stone refers to a decorative material, which is made from adhesives, fillings of various sizes and additives through a certain manufacturing process, and which has a texture or decorative pattern like a natural marble or granite. Artificial marbles are of a kind that is most widely used among various kinds of artificial stones. When making an artificial marble, powders of calcium carbonate, silicon dioxide or aluminum hydroxide are used as main fillings, unsaturated polyesters or other high molecular polymers are used as adhesives, and the artificial marble has many features of a natural marble. Further, since an artificial marble can be adjusted artificially, it has many advantages, such as, various patterns and colors, good flexibility, non-obvious transition between different parts, high integrity, bright and colorful, ceramic-like sheen, high hardness, non-damageability, corrosion resistance, high temperature resistance, and very easy to clean.

A conventional process of manufacturing an artificial marble mainly comprises: selecting a formula; preparing ingredients according to the formula; agitating and mixing with a high speed; vacuuming; vibrating; moulding by compressing or squeezing; pre-curing; demoulding; curing (also known as post-curing); sawing; grinding; cutting and the like. Most steps of its manufacturing process need to be finished within one hour. However, the pre-curing step before the demoulding usually takes three to five hours and the post-curing usually takes ten to fifteen days because these steps are performed at a room temperature, which leads to long production period, slow market response and high cost concerning capital, workshop and the like. In order to shorten the curing time, usually a curing method using electric heating or 2450 MHz frequency microwave heating may be used. However, these two methods are only applicable to cure small-sized artificial marbles (a thickness of which is within a range of 0~30 cm) due to a bad heat conductivity of the artificial marble and a low penetrating power of 2450 MHz frequency microwave and other deficiencies, and they are not suitable for curing an artificial marble of larger sizes.

Currently, an artificial marble having large sizes such as having a thickness larger than 30 cm, and especially, block-like material (having a typical thickness of 0.9~1 meter) can only be cured at room temperature, and there is no report about methods which can significantly shorten the time for the curing step, neither domestically nor abroad.

SUMMARY

I. Technical Problem to be Solved

Considering of the above mentioned technical problems, the present disclosure provides a device and a method for heating and curing artificial stone with microwave, so as to solve the problem of curing an artificial stone having a larger size.

II. Technical Solutions

According to one aspect of the present disclosure, there is provided a device for heating and curing artificial stone with microwave. The device comprises: a microwave curing cavity, within which an incompletely cured artificial stone is placed, and the artificial stone being heated with microwave to be completely cured; wherein a frequency of the microwave is in a range of 300~1120 MHz.

According to another aspect of the present disclosure, there is provided a method for heating and curing artificial stone with microwave. The method comprises: Step A: moulding and pre-curing a raw material and demoulding the raw material to form an incompletely cured artificial stone; Step B: placing the incompletely cured artificial stone inside a microwave curing cavity; Step C: heating the artificial stone within the microwave curing cavity with the microwave to completely cure the artificial stone; and Step D: opening the microwave curing cavity and taking out the completely cured artificial stone.

III. Beneficial Effects

It can be seen from the above technical solutions that the device and method for heating and curing artificial stone with microwave according to the present disclosure have the following beneficial effects.

(1) A rapid curing of large-sized artificial stone can be achieved with a microwave having a frequency of 300~1120 MHz which has a strong penetrating power, and a maximum thickness of the artificial stone may be as much as 1.5 meters.

(2) An individually designed microwave curing cavity, within which a rapid curing of artificial stone can be performed.

(3) The microwave curing cavity is provided with a microwave feed inlet at the top thereof, and comprises a body having a lower opening and a bottom cover. A bottom of the body is provided with a shielding flange, the bottom cover can be moved back-and-forth by a rail conveyer and up-and-down by a lifting device. In a transportation state, the bottom cover is lowered down, and the artificial stone can be placed on the bottom cover. In a heating and curing state, the bottom cover is lifted upwards by the lifting device to be engaged with the shielding flange located at the bottom of the body, so as to form a sealed microwave curing cavity.

MAIN COMPONENTS

11—artificial marble;
12—bottom cover;
13—rail conveyer;
14—lifting device;
15—shielding flange;
16—microwave curing cavity;
17—microwave generator;
18—waveguide;
19—microwave feed inlet.

DETAILED DESCRIPTION OF EMBODIMENTS

In the present disclosure, microwave having a certain frequency (in a range of 300~1120 MHz, and particularly, 915±10 MHz), which has a good penetrating power to an artificial marble, is used to directly irradiate the artificial marble placed within a curing cavity, causing an intermolecular frictional movement, and microwave energy is converted into kinetic energy, which is finally converted into thermal energy, such that the artificial marble is rapidly heated, and the curing time is significantly shortened.

In order to more clearly set forth aims, technical solutions and beneficial effects of the present disclosure, the present disclosure will be described in detail hereinafter in conjunction with specific embodiments and the appended drawings.

To be noted, in the following two embodiments, a block-shaped material of an artificial marble is used as an example. Herein, the artificial marble refers to an artificial marble manufactured with powders of calcium carbonate, silicon dioxide or aluminum hydroxide being used as a main filling, unsaturated polyester or other high molecular polymers being used as an adhesive, and materials being prepared according to a particular formula. A maximum thickness of the artificial marble may be as much as 1.5 meters, wherein a typical thickness of the block-shaped material is 0.9~1 meter (m), and typical external sizes thereof may be 3.25 m×1.65 m×0.95 m, 2.75 m×1.85 m×0.95 m, 2.45 m×1.65 m×0.95 m, 1.65 m×0.65 m×0.95 m and the like.

Figure 1:
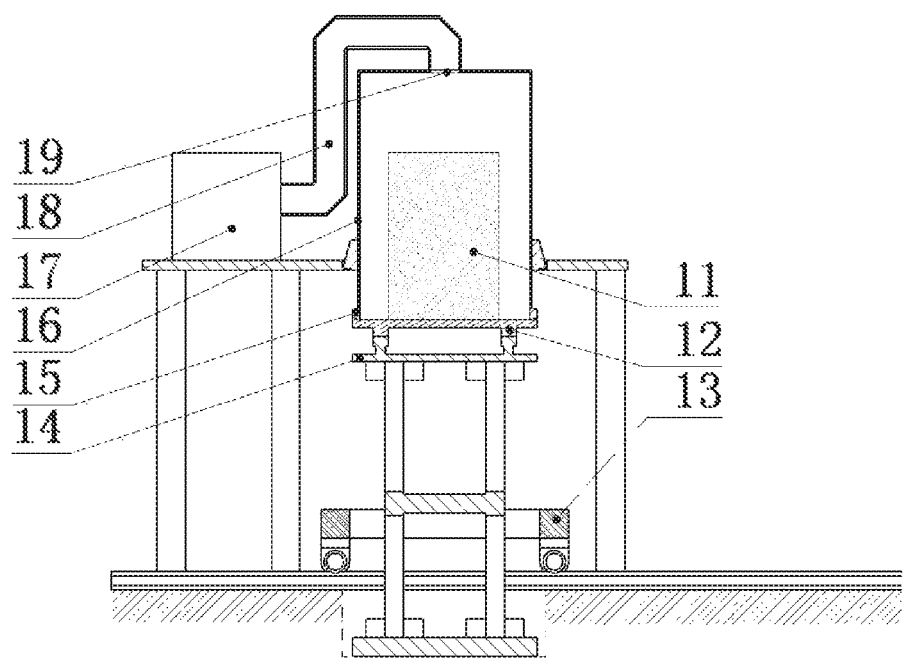
FIG. 1 is an illustrative drawing of a device for heating and curing an artificial marble with microwave, according to an embodiment of the present disclosure.

In an exemplary embodiment of the present disclosure, there is provided a device for heating and curing an artificial marble with microwave. FIG. 1 is an illustrative drawing of a device for heating and curing an artificial marble with microwave, according to an embodiment of the present disclosure. As shown in FIG. 1, the device for heating and curing an artificial marble with microwave according to the embodiment of the present disclosure comprises: a microwave generator 17, a waveguide 18, and a microwave curing cavity 16. An incompletely cured artificial marble is placed within the microwave curing cavity, the microwave generator 17 generates a microwave having a frequency in a range of 300~1120 MHz, and the microwave is transmitted via the waveguide 18 into the microwave curing cavity 16, to cure the artificial marble 11 placed within the cavity.

Individual components of this embodiment will be described in detail hereinafter, respectively.

Referring to FIG. 1, the microwave generator 17 generates a microwave having a frequency in a range of 300~1120 MHz, and the microwave is transmitted into the microwave curing cavity 16 via the waveguide 18. In a preferable embodiment of the present disclosure, the frequency of the microwave is set to 915 MHz, while in other preferable embodiments of the present disclosure, the frequency of the microwave may also be set to a frequency within a range from 905 MHz to 925 MHz, with which the technical solution of the present disclosure can also be implemented.

In the present embodiment, microwave input from a microwave feed inlet irradiates on the artificial marble 11, causing intermolecular frictional movements inside the artificial marble, microwave energy is converted into internal energy, and heat is generated, such that the artificial marble is uniformly heated entirely and cured rapidly.

Compared with prior art in which 2450 MHz microwave is used for heating and curing, microwave having a frequency in the range of 300~1120 MHz has a stronger penetrating power. With the microwave having a frequency of 915 MHz, a penetrating depth of the microwave, in its transmission state and when its power is attenuated to a half of its original value while irradiating to an unsaturated polyester resin type artificial marble, is about 0.65 meter, and the penetrating depth is about 1.80 meter when the power is attenuated to 13.5% (i.e., $1/e^2$) of its original value. Therefore, the microwave having a frequency of 915 MHz can completely penetrate an artificial stone having a thickness of 0.95 meter, which can meet the requirement for curing large-sized artificial stones.

In the present embodiment, a resonant cavity is used as the microwave curing cavity 16, the artificial marble is placed inside of the microwave curing cavity 16, the microwave having a frequency of 915 MHz is distributed in a certain field distribution mode inside the cavity, the microwave irradiates the top of the artificial marble, penetrates a thickness of 0.95 meter, then is reflected by a bottom of the cavity and reenter the artificial marble, until its power is totally attenuated and its energy is totally absorbed by the artificial marble. Therefore, microwave energy having the frequency of 915 MHz is more evenly distributed in a thickness direction of the artificial marble within the microwave curing cavity 16.

To be noted, in the present embodiment, with microwave to cure the incompletely cured artificial marble after demoulding, the time needed for the curing can be significantly shortened, for example, the curing time for a block-shaped material may be shortened from conventional 10-15 days to be within 1 to 2 hours.

Meanwhile, with microwave to cure the artificial marble, temperature of the artificial marble can be raised entirely, and internal temperature of the artificial marble is uniform, and simultaneously, internal gas is easy to be discharged to the outside, such that internal organization and structure of the artificial marble is more uniformed, hardness, tensile strength, heat resistance, environmental characteristics and other performances are improved, and product quality is improved.

Unlike the microwave curing devices in prior art in which a transporting structure is used, in the present embodiment, the microwave curing cavity 16 is provided separately. The microwave curing cavity 16 is designed in accordance with shape and sizes of the artificial marble, and in the present embodiment, the cavity is designed as a cuboid, and its sizes are set to be suitable for the artificial marble to be placed therein.

Referring to FIG. 1, in the present embodiment, microwave generated by the microwave generator 17 is transmitted into the microwave curing cavity 16 via the waveguide 18, but the present disclosure is not limited thereto. In another embodiment of the present disclosure, the microwave generator may be directly disposed inside the microwave curing cavity 16 at a suitable position, such that microwave generated by the microwave generator can be directly emitted into the microwave curing cavity without using the waveguide, which shall also fall within the scope of the present disclosure.

Further, it is to be noted that, in the present embodiment, different block-shaped materials for artificial marbles have the same or similar thickness but different lengths and widths, and the thickness of a maximum block-shaped material is its minimum size, therefore, the microwave feed inlet is arranged at the top of the microwave curing cavity 16 and microwave is fed from top to bottom. In other embodiments of the present disclosure, the position of the microwave curing cavity 16 is not limited to be at the top of the microwave curing cavity 16, and the position of the microwave feed inlet may be set in accordance with sizes of stone material.

Referring to FIG. 1, in the present embodiment, the microwave curing cavity 16 comprises: a body having a lower opening and a bottom cover 12. A bottom of the body is provided with a shielding flange 15. A rail is provided under the microwave curing cavity, and a transporting mechanism comprises a rail conveyer 13 and a lifting device 14 arranged under the rail conveyer. The bottom cover 12, on which an artificial marble is placed, may be moved back-and-forth by the rail conveyer 13 and be moved up-and-down by the lifting device 14. In a transportation state, the bottom cover 12 is lowered down, and the artificial marble 11 is placed on the bottom cover. In a heating and curing state, the rail conveyer 13 moves the bottom cover 12, on which the artificial marble is placed, to be under the body, and the bottom cover 12 is lifted upwards by the lifting device 14 to be engaged with the shielding flange 15 arranged at the bottom of the body, so as to form an electromagnetically sealed microwave curing cavity 16.

To be noted, the microwave curing cavity in the present disclosure is not limited to the form shown in FIG. 1. In another embodiment of the present disclosure, the microwave curing cavity may also comprise a body having a lateral opening and a lateral cover. The body and/or the lateral cover is provided with a shielding flange. In a transportation state, the lateral cover is opened, and the artificial marble is transported into the body, then the lateral cover is closed to form a closed microwave curing cavity with the body. This embodiment also falls within the scope of the present disclosure.

So far, the introduction of the device for heating and curing; an artificial marble with microwave according to the present embodiment is completed. To be noted, directional terms used in the present embodiment, such as "up", "down", "front", "rear", "left", "right" or the like, only refer to directions in the drawings, and do not intend to limit the scope of the present disclosure.

Based on the above-described device, an embodiment further provides a method for heating and curing an artificial marble with microwave. For the sake of simplification, descriptions of technical features which have the same functions as those in the embodiment of device are incorporated herein, and repeated descriptions thereof are omitted.

Figure 2:
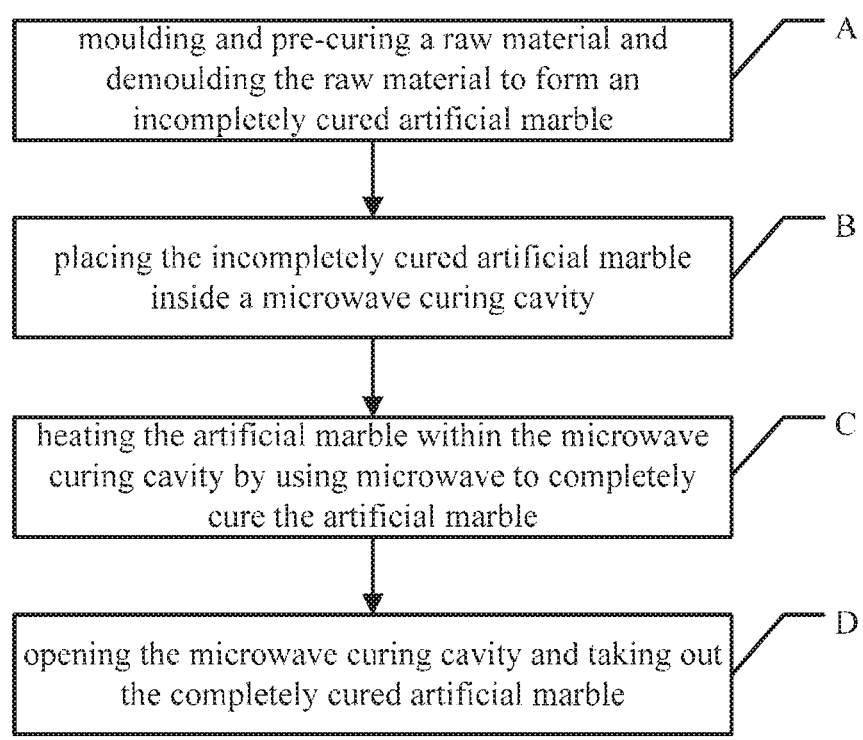
FIG. 2 is a flow chart of a method for heating and curing an artificial marble with microwave, according to an embodiment of the present disclosure.

FIG. 2 is a flow chart of a method for heating and curing an artificial marble with microwave, according to an embodiment of the present disclosure. As shown in FIG. 2, the method for heating and curing an artificial marble with microwave according to the embodiment of the present disclosure comprises the following steps.

Step A: preparing various materials for the artificial marble, mixing the materials by a high-speed agitating, then pouring the mixed material into a mould, moulding the materials through vibration, compressing and squeezing in a low vacuum environment, pre-curing the materials by laying aside the mould for a certain period of time and then demoulding the materials to form an incompletely cured artificial marble.

In the present embodiment, powder of calcium carbonate, silicon dioxide or aluminum hydroxide are used as a main filling, unsaturated polyester (UPR) or polymethyl methacrylate (PMMA) is used as an adhesive, materials are prepared according to a certain formula, mixed by high-speed agitating, then poured into a mould, molded through vibration, compressing and squeezing in a low vacuum environment, then pre-cured by laying the mould aside for a certain period of time and then demoulded to form an incompletely cured artificial marble 11.

Step B: placing the demoulded and incompletely cured artificial marble 11 inside the microwave curing cavity 16.

In the present embodiment, the demoulded and incompletely cured artificial marble 11 (a thickness thereof may be as much as 1.5 meters, and typically, 0.9 to 1 meter) is placed on the bottom cover 12 of the microwave curing cavity, then the bottom cover and the artificial marble 11 are moved by the rail conveyer 13 to be right under the reaction cavity, then the bottom cover is lifted by the lifting device 14 to be engaged with the shielding flange 15 at the bottom of the reaction cavity, and at this time, the artificial marble 11 is placed inside the electromagnetically sealed microwave curing cavity 16.

Step C: turning on the microwave generator 17, such that microwave emitted from the microwave generator 17 is transmitted by the waveguide 18 to be fed into the microwave curing cavity 16 through the top feed inlet 19 to heat the incompletely cured artificial marble 11 to completely cure it.

Microwave irradiates onto the artificial marble, causing intermolecular frictional movements, microwave energy is converted into internal energy, and heat is generated, such that the artificial marble is uniformly heated entirely and cured rapidly. In accordance with sizes, raw materials and components of the artificial marble, power of the microwave and heating time can be adjusted to control a heating temperature, and a desired heating temperature is 60~70° C.

Taking the curing process for a block-shaped material for an unsaturated polyester resin type artificial marble, which has external sizes of 1.65 m×0.65 m×0.95 m, as an example, a range of power of applied microwave is 30~60 kW/m³, a period of time for heating is 0.5~1.0 hour, a maximum temperature is in a range of 60~70° C., and a maximum raising rate of the temperature is 2° C./min.

Step D: opening the microwave curing cavity and taking out the completely cured artificial marble 11.

In the present embodiment, first, the bottom cover 12 of the microwave curing cavity is disengaged with the shielding flange 15 located at the bottom of the body, the completely cured artificial marble 11 is lowered down by the lifting device 14 and then transported by the rail conveyer to a suitable place.

After Step D, subsequent sawing, grinding, cutting and other processes to the completely cured artificial marble may be performed. A specific description of these processes will be omitted herein.

So far, the introduction of the method for heating and curing an artificial marble with microwave according to the present embodiment is completed. To be noted, examples of specific values of parameters are provided in the present embodiment, however, these parameters do not need to be exactly equal to these values, but may be similar to corresponding values within acceptable error margins or design constrains.

So far, two embodiments of the present disclosure have been described in detail with reference to the drawings. Based on the above description, an ordinary skilled in the art would have a clear understanding of the device and method for heating and curing an artificial marble with microwave.

It is to be noted that, implementations that are not shown or described in the drawings or the specification are well-known to those ordinary skilled in the art, thus, descriptions thereof are omitted. Additionally, components and methods are not limited to the specific structures, shapes or ways described in the embodiments, changes and substitutions thereof can be simply made by those skilled in the art, for example:

(1) shape and sizes of the microwave curing cavity can be adjusted as needed;

(2) temperature for heating the artificial stone in the microwave curing cavity may be adjusted as needed;

(3) the present disclosure is also applicable to artificial quartzite stone, artificial acryl stone and other products; further, the present disclosure is not only applicable to manufacture of block-shaped materials, but also applicable to plate-shaped, abnormal shaped, customized artificial stones and the like, and the present disclosure also applicable to small-sized artificial stones.

In summary, the present disclosure provides a device and a method for curing an artificial marble after the artificial marble is demoulded by using microwave heating technology. The device and the method are easy to be operated and implemented, have high practicability, are applicable for mass industrial production and customized production, and have a wide applicable prospect.

Objects, technical solutions and beneficial effects of the present disclosure are described in detail with reference to the above specific embodiments. It is to be noted, the above embodiments of the present disclosure are only illustrative and do not intend to limit the scope of the present disclosure. Any amendments, equivalent substitution, modification and the like within the spirits and principles of the present disclosure shall fall within the scope of the present disclosure.

What is claimed is:

1. A device for heating and curing a block shaped artificial stone with microwave, comprising:
   a microwave curing cavity, within which an incompletely cured block shaped artificial stone is placed, microwave being used to heat the block shaped artificial stone to completely cure the block shaped artificial stone,
   wherein a frequency of the microwave is in a range from 300 MHz to 1120 MHz;
   wherein the microwave curing cavity is a resonant cavity, and the microwave is distributed in a certain field distribution mode inside the resonant cavity;
   wherein the microwave curing cavity comprises a body having a lower opening and a bottom cover, the body and/or the bottom cover is provided with a shielding flange, the bottom cover and the body are sealed by the shielding flange to form an electromagnetically sealed microwave curing cavity; and
   wherein the artificial stone is one of the following stone materials: an artificial marble, an artificial quartzite stone and an artificial acryl stone.

2. A method for heating and curing a block shaped artificial stone with microwave by using the device according to claim 1, the method comprises:
   Step A: moulding and pre-curing a raw material and demoulding the raw material to form the incompletely cured block shaped artificial stone;
   Step B: placing the incompletely cured block shaped artificial stone inside the microwave curing cavity;
   Step C: heating the block shaped artificial stone within the microwave curing cavity with the microwave to completely cure the block shaped artificial stone; and
   Step D: opening the microwave curing cavity and taking out the completely cured artificial stone.

3. The method according to claim 2, wherein in Step C, a maximum temperature for heating the block shaped artificial stone inside the microwave curing cavity is in a range of 60~70° C.

4. The method according to claim 2, wherein in Step C, the power of the applied microwave is in a range of 30~60 kW/m$^3$, a time period for heating the block shaped artificial stone is 0.5~1.0 hour, a temperature for curing the block shaped artificial stone is in a range of 60~70° C., and a maximum raising rate of the temperature is 2° C./min.

5. The device according to claim 1, wherein the frequency of the microwave is in a range from 905 MHz to 925 MHz.

6. A method for heating and curing a block-shaped artificial stone with microwave by using the device according to claim 5, the method comprises:
   Step A: moulding and pre-curing a raw material and demoulding the raw material to form the incompletely cured block-shaped artificial stone;
   Step B: placing the incompletely cured block-shaped artificial stone inside the microwave curing cavity;
   Step C: heating the block-shaped artificial stone within the microwave curing cavity with the microwave to completely cure the block-shaped artificial stone; and
   Step D: opening the microwave curing cavity and taking out the completely cured artificial stone.

7. The method according to claim 6, wherein in Step C, a maximum temperature for heating the block-shaped artificial stone inside the microwave curing cavity is in a range of 60~70° C.

8. The method according to claim 6, wherein in Step C, the power of the applied microwave is in a range of 30~60 kW/m$^3$, a time period for heating the block-shaped artificial stone is 0.5~1.0 hour, a temperature for curing the block-shaped artificial stone is in a range of 60~70° C., and a maximum raising rate of the temperature is 2° C./min.

9. The device according to claim 1, wherein the device further comprises:
   a microwave generator; and
   a waveguide configured to transmit the microwave generated by the microwave generator into the microwave curing cavity.

10. A method for heating and curing a block-shaped artificial stone with microwave by using the device according to claim 9, the method comprises:
    Step A: moulding and pre-curing a raw material and demoulding the raw material to form the incompletely cured block-shaped artificial stone;
    Step B: placing the incompletely cured block-shaped artificial stone inside the microwave curing cavity;
    Step C: heating the block-shaped artificial stone within the microwave curing cavity with the microwave to completely cure the block-shaped artificial stone; and
    Step D: opening the microwave curing cavity and taking out the completely cured artificial stone.

11. The method according to claim 10, wherein in Step C, the power of the applied microwave is in a range of 30~60 kW/m$^3$, a time period for heating the block-shaped artificial stone is 0.5~1.0 hour, a temperature for curing the block-shaped artificial stone is in a range of 60~70° C., and a maximum raising rate of the temperature is 2° C./min.

12. The device according to claim 9, wherein a microwave feed inlet is arranged on top of the microwave curing cavity; and the microwave transmitted by the waveguide is fed through the microwave feed inlet into the microwave curing cavity from above to heat the block shaped artificial stone.

13. A method for heating and curing a block-shaped artificial stone with microwave by using the device according to claim 12, the method comprises:

Step A: moulding and pre-curing a raw material and demoulding the raw material to form the incompletely cured block-shaped artificial stone;

Step B: placing the incompletely cured block-shaped artificial stone inside the microwave curing cavity;

Step C: heating the block-shaped artificial stone within the microwave curing cavity with the microwave to completely cure the block-shaped artificial stone; and Step D: opening the microwave curing cavity and taking out the completely cured artificial stone.

14. The method according to claim 13, wherein in Step C, the power of the applied microwave is in a range of 30~60 kW/m$^3$, a time period for heating the block-shaped artificial stone is 0.5~1.0 hour, a temperature for curing the block-shaped artificial stone is in a range of 60~70° C., and a maximum raising rate of the temperature is 2° C./min.

15. The device according to claim 1, wherein in a transportation state, the bottom cover is lowered down, the block shaped artificial stone is placed on the bottom cover; and in a heating and curing state, the bottom cover is lifted up to be engaged with the body, the bottom cover and the body are sealed by the shielding flange to form an electromagnetically sealed microwave curing cavity, and the block shaped artificial stone is placed inside the microwave curing cavity.

16. A method for heating and curing a block-shaped artificial stone with microwave by using the device according to claim 15, the method comprises:

Step A: moulding and pre-curing a raw material and demoulding the raw material to form the incompletely cured block-shaped artificial stone;

Step B: placing the incompletely cured block-shaped artificial stone inside the microwave curing cavity;

Step C: heating the block-shaped artificial stone within the microwave curing cavity with the microwave to completely cure the block-shaped artificial stone; and Step D: opening the microwave curing cavity and taking out the completely cured artificial stone.

17. The method according to claim 16, wherein in Step C, the power of the applied microwave is in a range of 30~60 kW/m$^3$, a time period for heating the block-shaped artificial stone is 0.5~1.0 hour, a temperature for curing the block-shaped artificial stone is in a range of 60~70° C., and a maximum raising rate of the temperature is 2° C./min.

18. The device according to claim 15, wherein a rail is provided under the microwave curing cavity;

the device further comprises a rail conveyer capable of moving back-and-forth along the rail and a lifting device arranged under the rail conveyer; and before heating and curing the block shaped artificial stone, the rail conveyer moves the bottom cover, on which the block shaped artificial stone is placed, to be under the body, and the lifting device drives the bottom cover upward to be engaged with the body.

19. A method for heating and curing a block-shaped artificial stone with microwave by using the device according to claim 18, the method comprises:

Step A: moulding and pre-curing a raw material and demoulding the raw material to form the incompletely cured block-shaped artificial stone;

Step B: placing the incompletely cured block-shaped artificial stone inside the microwave curing cavity;

Step C: heating the block-shaped artificial stone within the microwave curing cavity with the microwave to completely cure the block-shaped artificial stone; and Step D: opening the microwave curing cavity and taking out the completely cured artificial stone.

20. The method according to claim 19, wherein in Step C, the power of the applied microwave is in a range of 30~60 kW/m$^3$, a time period for heating the block-shaped artificial stone is 0.5~1.0 hour, a temperature for curing the block-shaped artificial stone is in a range of 60~70° C., and a maximum raising rate of the temperature is 2° C./min.

* * * * *